United States Patent Office 2,784,521
Patented Mar. 12, 1957

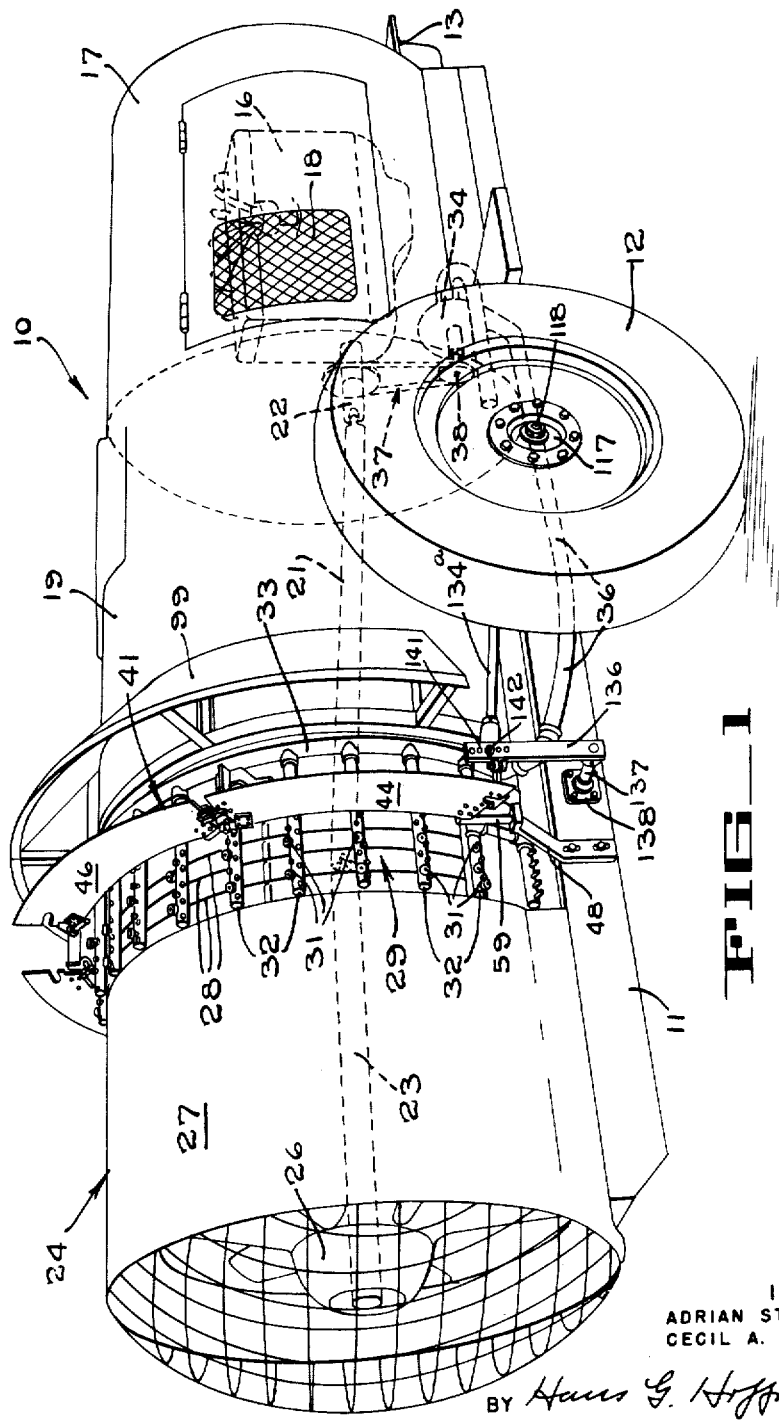

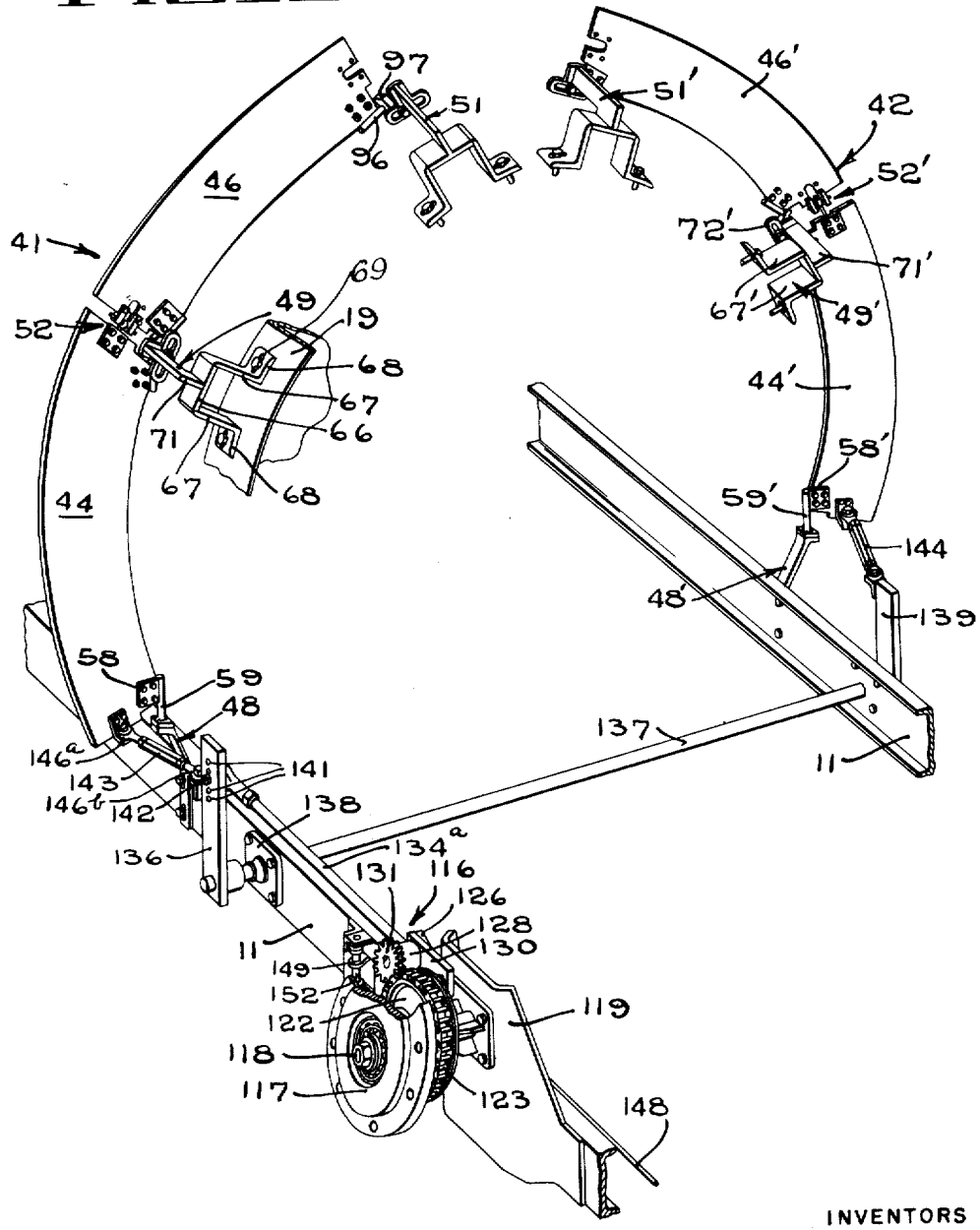

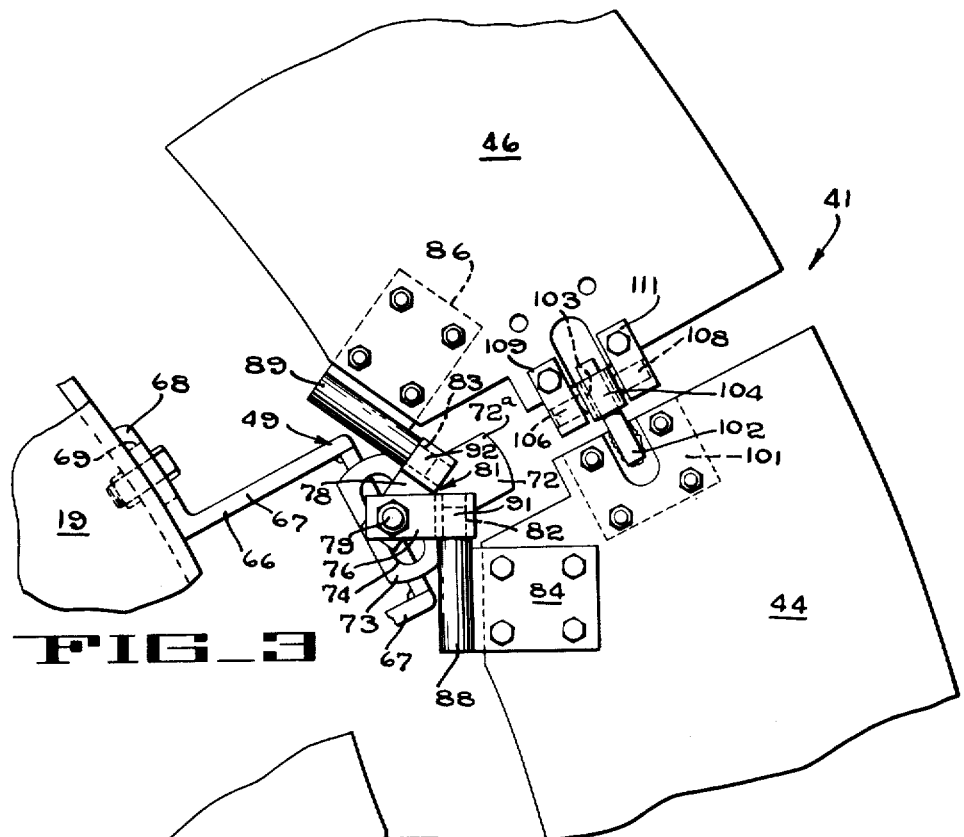
FIG_3
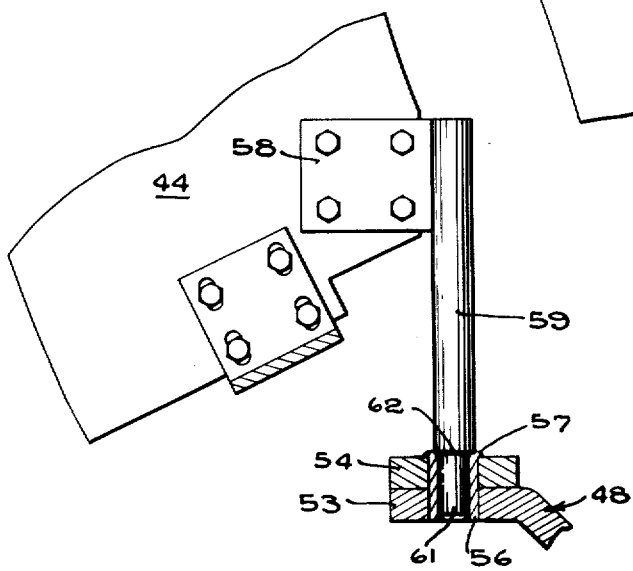
FIG_4

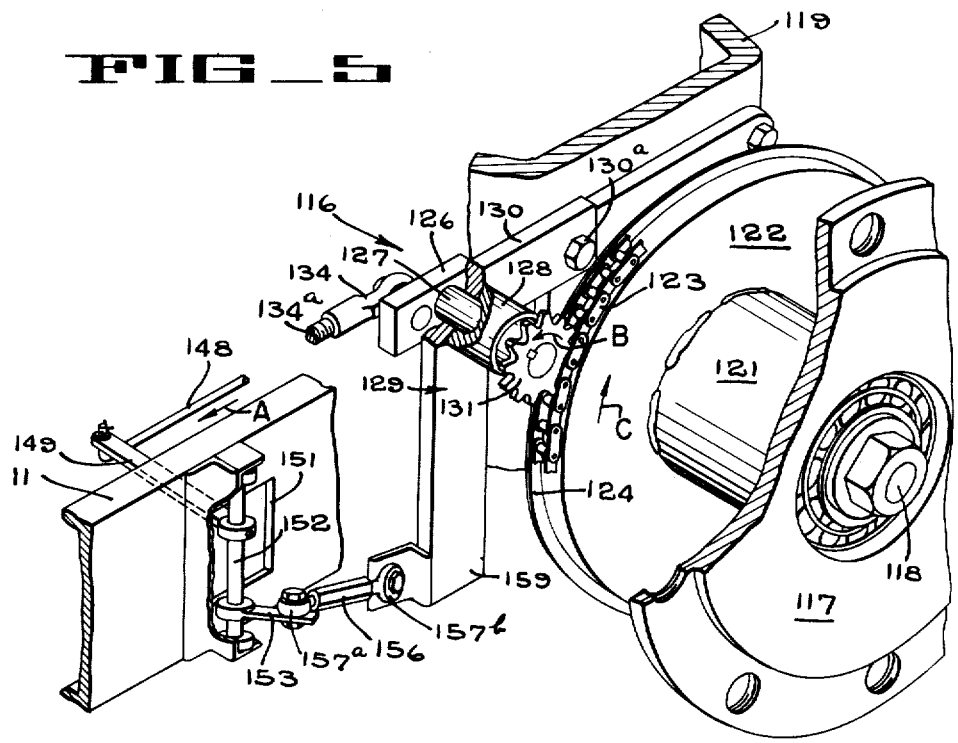
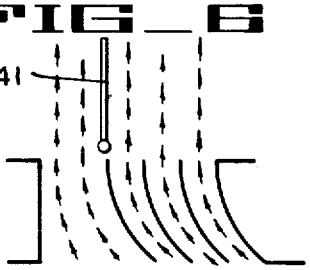
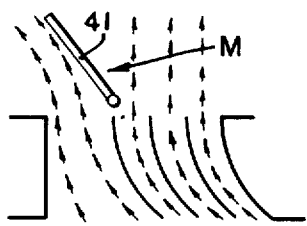
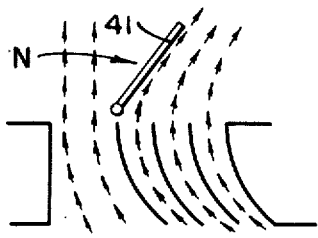

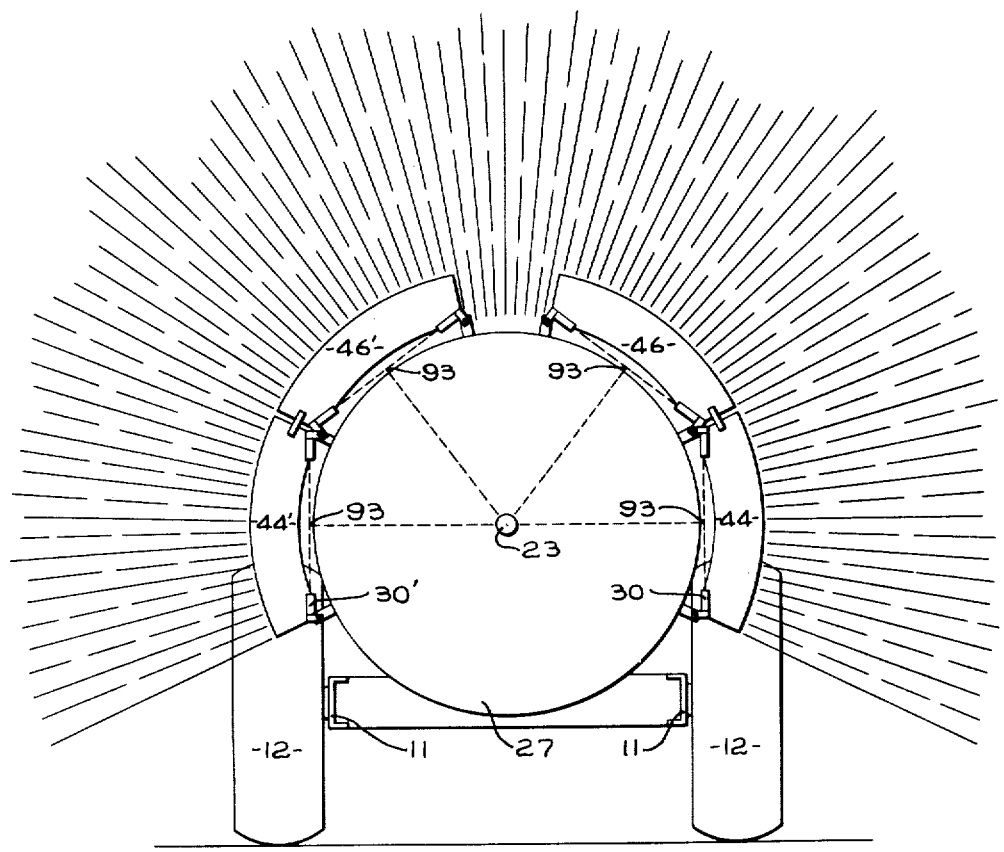
FIG_9

2,784,521

METHOD AND APPARATUS FOR DISTRIBUTING PESTICIDE

Cecil A. Britten and Adrian St. J. Bowie, San Jose, Calif., assignors to Food Machinery and Chemical Corporation, San Jose, Calif., a corporation of Delaware Application September 30, 1952, Serial No. 312,312

12 Claims. (Cl. 43—148)

The present invention relates to a method and apparatus for distributing pesticide wherein pesticide in the form of a fine spray or dust is densely entrained in an air blast for subsequent deposition on plants, such as trees, bushes, and the like.

One object of the present invention is to provide an improved method of distributing pesticide to plants.

Another object of the present invention is to provide an improved pesticide distributing mechanism of the air blast type.

Another object is to provide an air blast type pesticide distributor having a novel air blast oscillating mechanism.

A further object is to provide a pesticide distributor that will deposit pesticide evenly on all surfaces of a plant.

Another object is to provide a pesticide distributor of the air blast type having a mechanism for intermittently creating a stagnant air region within said air blast.

Still another object is to provide a pesticide distributor capable of directing an oscillating, pesticide-containing air blast against trees, bushes and the like plants, in such a manner that densely growing branches and foliage are separated and overlapping of leaf upon leaf and branch upon branch during the application of pesticide to the plant is prevented.

These and other objects and advantages of the present invention will become more apparent upon study of the following description and drawings in which:

Fig. 1 is a perspective view from the rear of an air blast spraying machine embodying the present invention.

Fig. 2 is a fragmentary perspective view from the front of the machine shown in Fig. 1, showing on an enlarged scale, the actual air blast oscillating mechanism of the invention.

Fig. 3 is an enlarged rear elevational view of a portion of the mechanism shown in Fig. 2.

Fig. 4 is an enlarged, fragmentary, front elevational view of a portion of the mechanism shown in Fig. 2, certain parts being shown in section.

Fig. 5 is a fragmentary perspective of a portion of the spraying machine viewed in substantially the same direction as Fig. 1.

Figs. 6 through 8 are diagrammatic, horizontal, sectional views of a portion of the spraying machine illustrating the path of the air blast discharged therefrom at various phases in the operation thereof.

Fig. 9 is a diagrammatic rear elevation of the spray machine illustrating the sector-shaped air blast pattern emitted therefrom.

The present invention is herein disclosed in connection with a pesticide spraying machine 10 (Fig. 1) which comprises a frame 11 mounted on rubber-tired wheels 12 (only one of which is shown) and having a tongue 13 at its forward end by which the machine can be hitched to a tractor, not shown, to be drawn thereby between rows of plants, such as trees in an orchard.

An internal combustion engine 16, shown in dotted lines in Fig. 1, is mounted in a compartment 17 at the forward end of the machine 10, and a screened door 18 is provided in the curved wall of the compartment to admit cooling and combustion air thereto and to allow for easy access to the engine. A liquid pesticide supply tank 19 is mounted on the frame 11 behind the compartment 17, said tank having an inclined, open-ended tube (not shown) extending longitudinally therethrough to house a shaft 21 flexibly connected between the drive shaft 22 of the engine 16 and the shaft 23 of an air blast creating, shaping and discharge mechanism 24 mounted at the rear of the frame 11.

The air blast mechanism 24 is similar to that shown and described in U. S. Patent No. 2,476,960 for a Spraying and Dusting Machine, granted to G. W. Daugherty on July 26, 1949, and generally comprises an axial flow propeller 26 (Fig. 1) rigidly mounted on the shaft 23 at the open rear end of a hollow cylindrical housing 27. Rotation of the propeller 26 generates a longitudinal, forwardly moving air blast within the housing 27 which is directed radially thereof by a nested series of stationary frusto-conical deflectors 28 (only the outer trailing edge of which is shown) mounted at the forward end of said housing, said air blast being discharged at 29 in a sector-shaped pattern in a substantially vertical plane normal to the path of the spraying machine and extending upwardly and outwardly from both sides of the machine in an arc which extends between the points 30, 30' as diagrammatically shown in Fig. 9.

Liquid pesticide may be fed to the sector-shaped air blast in any suitable manner, for example, by outwardly directed spray nozzles 31 provided in longitudinal pipes 32 that are arranged along the circumference of the housing 27 equal angular distances apart and extend rearwardly over the air blast discharge region 29 from an arched header pipe 33 mounted on the rear portion of the tank 19. Pesticidal liquid from the tank 19 is supplied under pressure to the header pipe 33 and thence to the nozzles 31 by a conventional liquid pump 34 through a flexible hose 36. In the present embodiment, the pump 34 is driven by the engine 16 through a V-belt and pulley assembly 37 operatively connecting the engine drive shaft 22 with the pump shaft 38. As the pesticidal liquid is forced from the spray nozzles 31 it is broken into a great number of extremely small particles which immediately become entrained in the air blast whereby there is formed a voluminous, sector-shaped, pesticidal fog ideally suited for the uniform coverage of most types of trees with pesticide.

Pesticide distributing apparatus of the air blast type, such as the spraying mechanism generally described above, are well known and understood by those in the art and hence further description thereof is unnecessary, the description so far given being sufficient for a general comprehension of the structure thereof. Pesticide distributors of this type have generally proved highly efficient and are in extensive use, particularly in areas where large acreages are under cultivation. However, this type of pesticide distributor has not been found so effective in treating citrus and other trees having long, flexible branches and dense foliage, for example, orange and walnut trees, due to the fact that their branches and foliage have a tendency to "shingle" or overlap under the action of a continuous radially-directed air blast, thus forming a barrier through which the pesticidal fog cannot penetrate so that complete coverage of the trees is not attained. The present inventors have found that this "shingling" of the branches and foliage of citrus trees, and the like, may be prevented and the same may be individually separated by rapidly oscillating an air blast discharged in a plane rising from the ground and extending transversely of the direction of travel of the distributor, back and forth of said plane as the distributor is drawn past the trees. In this manner, it is possible to cover all surfaces of the trees with pesticide.

In accordance with the invention, therefore, air blast oscillating means 41 and 42 (Fig. 2) are provided adjacent the region of air blast discharge 29 of the machine to swing the air blast emanating therefrom in a substantially vertically rising plane continuously fore and aft of said spraying machine. Since the air blast oscillators 41 and 42 are similar in construction, arrangement and operation, only the oscillator 41 situated at the right side of the spraying machine 10 will be specifically described, and the parts of the oscillator 42 that correspond to the described parts of the oscillator 41 will be indicated in the drawings by identical numerals with a prime (′) added.

The air blast oscillator 41 comprises two identical vanes 44 and 46 of annular sector shape which are circumferentially arranged transversely of the spraying mechanism intermediate of the air blast discharge region 29. Said vanes are pivotally mounted upon brackets 48, 49 and 51 (Fig. 2) and are drivingly connected at 52 for sympathetic fore and aft oscillation.

The bracket 48 is adjustably bolted to the right outer side of the frame 11 (Figs. 1 and 2) and extends upwardly and outwardly therefrom, its upper end being provided with a horizontal ledge 53 (Fig. 4) to which is welded a face plate 54. The horizontal ledge 53 and face plate 54 are vertically bored to receive a cylindrical thrust bearing 56 which is retained in the bore by an upper end flange 57 formed integral therewith. A square plate 58 is bolted to the lower inner end of the arcuate vane 44 and has a cylindrical pin 59 welded to its inner edge. The pin 59 extends downwardly from the plate 58 and has a reduced bottom portion 61 that engages the cylindrical thrust bearing 56. A shoulder 62 at the upper end of the reduced portion 61 bears against the flange 57 of the thrust bearing 56 thereby supporting the lower end of the vane 44 for pivotal movement about the axis of the pin 59.

The bracket 49 (Fig. 2) pivotally supports the upper end of the vane 44 and the lower end of the vane 46. Said bracket 49 comprises an inverted U-shaped member 66 having the free end of its legs 67 turned outwardly to form feet 68. Securing slots 69 are formed in the feet 68 to allow said bracket 49 to be adjustably bolted to the cylindrical surface of the pesticide supply tank 19. An arm 71 is fastened to the bight of the U-member 66 and projects rearwardly therefrom over the air blast discharge region 29 of the machine. Rigidly secured to the rear end of said arm 71 is the center leg 72*a* of an inverted T-shaped member 72 whose cross piece 73 (Fig. 3) forms an elongated slot 74. Through said slot two blocks 76 and 78 (Fig. 3) are adjustably secured in crossed relationship to the cross piece 73 by a machine bolt 79. The blocks 76 and 78 are identical in construction and are recessed at their crossed ends, as indicated at 81, in order that holes 82 and 83 provided in their free ends may have their center lines in the same transverse plane. Plates 84 and 86 are bolted to the upper and lower inner ends of the vanes 44 and 46, respectively, and have cylindrical pins 88 and 89 welded to their inner edges. Said pins 88 and 89 project toward each other beyond the lateral edges of their respective plates 84 and 86 and have reduced end portions 91 and 92, respectively, which engage with the holes 82 and 83 in the blocks 76 and 78.

The bracket 51 (Fig. 2) is identical in construction with the bracket 49 and is adjustably bolted to the tank 19 in the same manner as said bracket 49. The upper end of the vane 46 is pivotally supported by the bracket 51 in a manner similar to that described for the mounting of the upper end of the vane 44 to the bracket 49, in that a cylindrical pin 96 secured to the vane 46 is rotatably mounted in a block 97 adjustably bolted to the bracket 51. It should be noted that the two cylindrical supporting pins secured at opposite ends of each vane 44 and 46 are arranged with their axes coincident in order that said vanes may be oscillated about the axis of said pins and that this pivotal axis will always lie tangent to an arc of the sector-shaped pattern as at points 93 of Fig. 9.

To drivingly connect the vanes 44 and 46 (Fig. 2) so that oscillation of one vane will cause a similar oscillation of the other vane, a plate 101 (Fig. 3) is bolted to the lower vane 44 adjacent its upper edge. A drive pin 102 is welded to the plate 101 and projects upwardly into sliding engagement with a central opening 103 in a crosshead 104. Said crosshead is provided with two trunnions 106 and 108 that are journaled in a pair of spaced bearing blocks 109 and 111 bolted to the lower edge of the upper vane 46.

To prevent low hanging branches from striking the air blast oscillators 41 and 42 (Fig. 1) and to prevent the leaves and twigs of said branches from being stripped or knocked therefrom by the abrupt fore and aft motion of said oscillators, a frusto-conically shaped guard 99 is mounted on the rear portion of the pesticide solution tank 19 just forward of the header pipe 33 to hold all such branches and foliage out beyond the path of said oscillators.

During practical performance the air blast oscillators 41 and 42 may be rapidly flapped fore and aft of the spraying machine 10 by a drive mechanism 116 (Fig. 2) which is operatively associated with the right ground engaging wheel 12 of said spraying machine. The hub 117 of the wheel 12 is rotatably mounted on a horizontal stub axle 118 extending outwardly from a plate bracket 119 (Fig. 2) that is welded to the outer right side of the frame 11. The wheel hub 117 is formed with an inwardly projecting tube 121 (Fig. 5) that concentrically surrounds the outer end portion of the axle 118. An annular drive disc 122 is concentrically secured to the inner end of the tube 121 and a continuous chain 123 is fastened in any desired manner to the periphery of said disc 122. A circumferential flange 124 extends outwardly from the inner peripheral edge of the disc 122 to aid in properly securing the chain 123 to the periphery of said disc.

Movement of the spraying machine over the ground rotates the drive disc 122 whose rotary motion is transformed into an oscillating motion by a bar-shaped crank 126, the shaft 127 of which is journaled in a boss 128 formed in the elbow of a bent arm 129 whose upper end 130 is pivoted to the plate bracket 119 at 130*a*. The crankshaft 127 extends outwardly from the boss 128 and carries a sprocket wheel 131, that may be engaged with the chain 123, upon appropriate movement of the arm 129. A pitman 134 pivotally connects the crank 126 with the upper end of an arm 136 (Fig. 2) that rises from and is secured to one end of a transverse shaft 137 which is journaled in bearings 138, that are fastened to the frame 11 on opposite sides of the sprayer. A similar arm 139 is rigidly mounted on the other end of the shaft 137. The upper end of arm 136 has a choice of vertically spaced holes 141 each of which may selectively be engaged by the wrist pin 142 of the connecting rod 134*a* to vary the amplitude of oscillation of the arms 136 and 139 as imparted from the crank 126. Links 143 and 144 pivotally connect the upper ends of the levers 136 and 139, respectively, through universal bearings 146*a* and 146*b*, with the lower vanes 44 and 44′ of the air blast oscillating means 41 and 42 at points outwardly removed from their hinge rods 59 and 59′, respectively.

The operation of the air blast oscillators 41 and 42 may be controlled from the forward portion of the spraying machine 10 by a rearwardly extending rod 148 (Figs. 2 and 5) pivotally connected to an arm 149 (Fig. 5) which passes through an opening 151 in the right side of the sprayer frame 11 and is rigidly secured to a vertical shaft 152 pivotally mounted on the outer right side of said frame 11. A second arm 153 is securely fastened to the shaft 152 adjacent its lower end and extends outwardly therefrom. A link 156 pivotally connects the outer end of said arm 153 by means of universal joints 157a and 157b, respectively, with the lower end 159 of the bent arm 129 which carries the crank shaft 127.

From the above description it will be readily seen that when the rod 148 is moved rearwardly in the direction of the arrow A (Fig. 5) the arm 153 secured to the shaft 152 will be rotated forwardly thus moving the arm 129 counterclockwise (Fig. 5) about its pivot 130a. This counterclockwise movement of the arm 129 brings the sprocket 131 into engagement with the chain 123 secured around the periphery of the drive disc 122, thereby operatively connecting the crank 126 with the ground wheel 12. As a result thereof the vanes 44, 44', 46 and 46' are oscillated as a vehicle rolls along the ground. Conversely, when the rod 148 is moved forwardly the arm 153 will be rotated rearwardly, the bent arm 129 will pivot clockwise about the pivotal connection 130a and the sprocket 131 will be disengaged from the chain 123, thereby interrupting the transmission of motion from the ground wheel 12 to the crank 126. Oscillation of the vanes 44, 44', 46 and 46' will, therefore, cease.

In operation, the spraying machine 10 is drawn between parallel rows of trees while it continuously emits a sector-shaped pesticidal air blast. When treating citrus trees and the like, said air blast is continuously and rapidly oscillated fore and aft of the machine by constantly swinging the oscillators 41 and 42 fore and aft about their pivotal axes. The oscillator drive mechanism 116 should be so designed that the oscillators 41 and 42 will swing through a number of cycles while the spraying machine moves over the ground a distance substantially equal to the width of the trees or bushes being treated. The sprayer operator may place the air blast oscillators 41 and 42 in motion by pushing the rod 148 (Fig. 5) rearwardly to cause the sprocket 131 to mesh with the chain 123 whereupon said sprocket is rotated in the direction of the arrow B by the drive disc 122 secured to the right ground wheel 12 which rotates in the direction of the arrow C as the spraying machine travels forwardly. This rotation of the sprocket 131 actuates the crank 126 which causes longitudinal reciprocation of the connecting rod 134 and a fore and aft oscillation of the levers 136 and 139 secured on the shaft 137. The oscillatory movement of the levers 136 and 139 is transmitted by the links 143 and 144 to the lower air blast oscillating vanes 44 and 44' the oscillation of which causes the upper vanes 46 and 46' to oscillate in sympathy therewith due to their pin and cross head connection at 52.

The amplitude of oscillation of the vanes 44, 46, 44' and 46' may be varied by fastening the connecting pin 142 in different ones of the holes 141 in the lever 136. It will be noted that the closer to the shaft 137 the connecting pin is positioned the greater will be the amplitude of oscillation of the oscillator vanes 44, 46, 44' and 46'.

The effect of this rapid fore and aft pivotal movement of the air blast oscillating means 41 and 42 upon the air blast issuing from the spraying machine 10 is shown diagrammatically in Figs. 6 through 8 in connection with the air blast oscillator 41 positioned at the right side of the machine. As the vanes of the oscillator 41 swing forwardly from their neutral position, illustrated in Fig. 6, they progressively intercept and turn an increasingly larger part of that portion of the air blast which is forward of the oscillator 41 toward the front of the machine, until, when the vanes reach the forward limit of their swing, illustrated in Fig. 7, the forward portion of the air blast is deflected toward the front of the machine at an acute angle therewith and a region of relatively stagnant air is formed between the front and rear portions of the air blast, as shown at M in Fig. 7. Then as the oscillator 41 swings rearwardly toward its neutral position (Fig. 6) it is progressively withdrawn from its air blast intercepting position and the forward portion of the air blast turns rearwardly until said forward portion of the air blast again discharges in a direction normal to the path of the spraying machine. Further rearward pivoting of the oscillator 41 results in a rearward turning of the back portion of the air blast until the oscillator reaches its extreme rearwardly directed position illustrated in Fig. 8, when the rear portion of the air blast is deflected toward the back of the machine at an acute angle therewith and a region of relatively stagnant air is again formed between the front and rear portions of the air blast, as shown at N in Fig. 8. Then the oscillator 41 again swings forwardly toward its neutral position allowing the rear portion of the air blast to turn forwardly, all in a manner similar to that explained above for the front portion of the air blast.

As will now be understood the uninterrupted swinging of the oscillators 41 and 42 results in a continuous fore and aft oscillation of the air blast issuing from the discharge region 29 which causes the tree branches to sway back and forth and the leaves to flutter, thus separating densely growing foliage and branches, and assuring complete coverage of the trees with pesticide. The positioning of the oscillators 41 and 42 directly in the path of the air blast rather than to one side or the other thereof results upon fore and aft swinging in the intermittent formation of an area of relatively stagnant air within the air blast, which aids in the separation and agitation of the tree foliage and branches.

While we have described a preferred embodiment of the present invention, it will be understood that various changes and modifications may be made in the details thereof without departing from the spirit and scope of the appended claims.

Having thus described the invention what we claim as new and desire to protect by Letters Patent is:

1. A mobile pesticide distributor adapted for movement past plants to be treated comprising means for creating and discharging an air blast in a plane extending transversely of the direction of travel of the distributor, means for repeatedly oscillating said air blast toward and away from the vertical centerline of each plant during the treatment of each plant, and means for introducing pesticide into said air blast.

2. A mobile pesticide distributing mechanism arranged to move along a predetermined path comprising means for creating and discharging an air blast, means for delivering pesticide to said air blast, and means arranged to be driven by the motion of said distributing mechanism for successively oscillating separate portions of said air blast, each period of oscillation of the portions of said air blast being of equal duration.

3. An apparatus for distributing pesticide to plants comprising a vehicle adapted for movement past said plants, means mounted on said vehicle for forming an air blast and for discharging it in a sector-shaped pattern normal to the direction of movement of said vehicle, means for supplying pesticide to said air blast, an air blast deflector pivotally mounted on said vehicle intermediate said air blast with its pivotal axis arranged tangent to an arc of said sectoral air blast pattern, and means for oscillating said deflector about said axis, to alternately deflect different portions of said air blast relative to one another.

4. An apparatus for distributing pesticide to plants comprising a vehicle adapted for movement past said plants, means mounted on said vehicle for forming and discharging an air blast, said air blast forming and discharging means having a curved discharge opening lying in a plane transverse to the vehicle, a curved vane pivotally supported from said vehicle within said air blast outwardly of and concentrically with said discharge opening, and means for oscillating said vane to alternately deflect different portions of said air blast relative to one another.

5. An apparatus for distributing pesticide to plants comprising a vehicle adapted for movement past plants, means on said vehicle for forming and discharging an air blast laterally thereof, means for supplying pesticide to said air blast, air blast deflecting means pivotally mounted on said vehicle directly within the path of said air blast with its axis in a plane extending transversely of the direction of movement of the vehicle, and drive means operatively connected with said air blast deflecting means to cyclically oscillate said air blast deflecting means through a plurality of cycles while the vehicle moves a distance substantially equal to the width of a plant.

6. Apparatus for distributing pesticide to plants comprising a vehicle adapted for movement past plants, means on said vehicle for forming and discharging an air blast laterally thereof, said air blast being of appreciable width in a direction longitudinally of said vehicle, means for supplying pesticide to said air blast, air blast deflecting means pivotally mounted on said vehicle directly within the path of said air blast with its axis in a transverse plane bi-secting said air blast, and means operable to swing said air blast deflecting means about said axis in a direction fore and aft of the machine to oscillate the individual portions of said bi-sected air blast relative to each other.

7. A pesticide distributing mechanism comprising a vehicle adapted for movement past plants to be treated, means on said vehicle for creating and discharging an air blast in a predetermined direction, means for delivering a pesticide to said air blast, a pair of air blast deflectors pivotally mounted in end-to-end relationship on said frame to intercept said air blast, the pivotal axes of said deflectors being arranged at an angle with each other, means for oscillating one of said air blast deflectors, and means drivingly interconnecting said deflectors to cause oscillation of the other of said deflectors upon oscillation of said first mentioned deflector.

8. The method of applying pesticide to a plant which comprises directing an air blast against the plant, entraining pesticide in the air blast, splitting the air blast into two parts, temporarily interrupting one part of the split air blast impinging against a first portion of the plant while the other said part of the air blast continues to strike a second portion of the plant, and discontinuing interruption of said one part of the air blast to resume impingement of the air blast against both of said portions of the plant.

9. The method of applying pesticide to a plant which comprises directing an air blast against the plant, entraining pesticide in the air blast, splitting the air blast into two parts, temporarily interrupting one part of the split air blast impinging against a first portion of the plant while the other said part of the air blast continues to strike a second portion of the plant, discontinuing interruption of said one part of the air blast to resume impingement thereof against the plant, thereafter temporarily interrupting said other part of the air blast impinging against said second portion of the plant while said one part of the air blast continues to strike said first portion of the plant, and then discontinuing interruption of said other part of the air blast to resume impingement of the air blast against both of said portions of the plant.

10. An apparatus for distributing pesticide to plants comprising a vehicle adapted for movement past plants, means on said vehicle for forming an air blast and discharging it laterally of the path of the vehicle, means for supplying pesticide to said air blast, air blast deflecting means pivotally mounted on said vehicle with its axis in a plane extending transversely of the direction of movement of the vehicle and arranged to intercept and deflect said air blast, and driving means operatively connected with said air blast deflecting means to oscillate said air blast deflecting means through a plurality of cycles while the vehicle moves a distance substantially equal to the width of a plant, said deflecting means being arranged to cause the air blast to traverse a substantial portion of the width of the plant twice during each oscillation.

11. A pesticide distributing mechanism comprising a vehicle adapted for movement past plants to be treated, means on said vehicle for creating and discharging an air blast in a predetermined direction, means for delivering a pesticide to said air blast, a pair of air blast deflectors pivotally mounted on said frame to intercept said air blast and having the pivotal axes of said deflectors arranged at an angle with each other, means for oscillating one of said air blast deflectors, and means drivingly interconnecting said deflectors to cause oscillation of the other of said deflectors upon oscillation of said first-mentioned deflector.

12. A pesticide distributing vehicle adapted to be drawn along a path parallel to a row of plants, means on said vehicle for creating an air blast and for discharging it laterally of said vehicle, means for delivering a pesticide to said air blast, air blast deflecting means pivotally supported from said vehicle and disposed within said air blast, and oscillating means for repeatedly oscillating said air blast deflecting means, said deflecting means being arranged to be driven by the motion of said vehicle along its path to intermittently deflect a portion of said air blast relative to the remainder thereof and with each oscillation being of equal duration.

References Cited in the file of this patent

UNITED STATES PATENTS

| | | |
|---|---|---|
| 1,851,406 | Ross et al. | Mar. 29, 1932 |
| 1,859,567 | Knapp et al. | May 24, 1932 |
| 2,238,120 | Launder | Apr. 15, 1941 |
| 2,538,879 | Newcomb et al. | Jan. 23, 1951 |
| 2,583,753 | Spreng et al. | Jan. 29, 1952 |
| 2,619,767 | Woock | Dec. 2, 1952 |

FOREIGN PATENTS

| | | |
|---|---|---|
| 561,059 | Great Britain | May 3, 1944 |
| 588,592 | Great Britain | May 28, 1947 |

Disclaimer 2,784,521.—*Cecil A. Britten* and *Adrian St. J. Bowie*, San Jose, Calif. METHOD AND APPARATUS FOR DISTRIBUTING PESTICIDE. Patent dated Mar. 12, 1957. Disclaimer filed May 19, 1965, by the assignee, *FMC Corporation*.

Hereby enters this disclaimer to all claims of said patent.

[*Official Gazette Aug. 10, 1965.*]